United States Patent
Liu et al.

(10) Patent No.: US 12,294,992 B2
(45) Date of Patent: May 6, 2025

(54) METHOD AND APPARATUS FOR MSGA TRANSMISSION

(71) Applicant: Lenovo (Beijing) Ltd., Beijing (CN)

(72) Inventors: Hongmei Liu, Changping District (CN); Zhi Yan, Xicheng District (CN); Yuantao Zhang, Dongcheng District (CN); Haipeng Lei, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 272 days.

(21) Appl. No.: 17/792,532

(22) PCT Filed: Jan. 22, 2020

(86) PCT No.: PCT/CN2020/073763
§ 371 (c)(1),
(2) Date: Jul. 13, 2022

(87) PCT Pub. No.: WO2021/146993
PCT Pub. Date: Jul. 29, 2021

(65) Prior Publication Data
US 2023/0060015 A1  Feb. 23, 2023

(51) Int. Cl.
*H04W 72/1268* (2023.01)
*H04L 1/08* (2006.01)
*H04W 56/00* (2009.01)

(52) U.S. Cl.
CPC ........... *H04W 72/1268* (2013.01); *H04L 1/08* (2013.01); *H04W 56/001* (2013.01)

(58) Field of Classification Search
CPC ........... H04W 72/1268; H04W 56/001; H04W 74/0833; H04L 1/08; H04L 5/0007; H04L 5/0044; H04L 5/005
See application file for complete search history.

(56) References Cited

U.S. PATENT DOCUMENTS 11,937,305 B2 *  3/2024  Li ...................... H04W 56/001
12,207,305 B2 *  1/2025  Svedman .......... H04W 74/0833
(Continued)

FOREIGN PATENT DOCUMENTS

CN  108293224 A  7/2018
CN  102440057 A  12/2019
(Continued)

OTHER PUBLICATIONS

3GPP TSG-RAN WG1 Meeting #98, Procedure for Two-step RACH, R1-1910907, Oct. 18, 2019. (Year: 2019).*
(Continued)

*Primary Examiner* — Tejis Daya
(74) *Attorney, Agent, or Firm* — FIG. 1 Patents

(57) ABSTRACT

Embodiments of the present application are related to a method and apparatus for physical random access channel (PRACH) repetitions. A method according to an embodiment of the present application includes: receiving signaling information indicating at least one of a total number of a set of preambles in a period, a total number of a set of physical uplink shared channel (PUSCH) resource units (PRUs) in the period, a preamble repetition number in the period and a PRU repetition number in the period; and determining a mapping ratio of preambles to PRUs in the period based on the received signaling information.

20 Claims, 11 Drawing Sheets

(56) References Cited

U.S. PATENT DOCUMENTS

| | | | |
|---|---|---|---|
| 2021/0112600 A1* | 4/2021 | Lei | H04L 5/0091 |
| 2022/0104226 A1 | 3/2022 | Hu et al. | |
| 2022/0240327 A1* | 7/2022 | Ko | H04W 74/08 |
| 2022/0353901 A1* | 11/2022 | Lin | H04W 76/20 |
| 2024/0365396 A1 | 10/2024 | Bala et al. | |

FOREIGN PATENT DOCUMENTS

| | | |
|---|---|---|
| CN | 110536418 A | 12/2019 |
| WO | 2016072257 A1 | 5/2016 |

OTHER PUBLICATIONS

3GPP TSG-RAN WG2 Meeting #106, Discussion on the MsgA resource selection, R2-1905655, May 17, 2019. (Year: 2019).*

Ericsson , "PUSCH selection and MsgA payloads in 2-step RA", 3GPP TSG-RAN WG2 #107bis, R2-1912682, Chongqing, China [retrieved Aug. 23, 2022]. Retrieved from the internet <https://www.3gpp.org/ftp/tsg_ran/WG2_RL2/TSGR2_107bis/Docs>., Oct. 2019, 4 Pages.

PCT/CN2020/073763 , "International Preliminary Report on Patentability", PCT Application No. PCT/CN2020/073763, Aug. 4, 2022, 7 pages.

PCT/CN2020/073763 , "International Search Report and Written Opinion", PCT Application No. PCT/CN2020/073763, Oct. 29, 2020, 9 pages.

ZTE , "Remaining issues of msgA channel structure", 3GPP TSG RAN WG1 #98bis, R1-1910002, Chongqing, China [retrieved Aug. 23, 2022]. Retrieved from the Internet <https://www.3gpp.org/ftp/tsg_ran/WG1_RL1/TSGR1_98b/Docs>., Oct. 2019, 26 Pages.

"Foreign Office Action", CN Application No. 202080090573.1, Dec. 30, 2024, 14 pages.

Intel Corporation, "Remaining issues on PUSCH resource unit selection for 2-step Rach", 3GPP TSG RAN WG2 #108, R2-1914843, Reno, Nevada, Nov. 2019, 4 pages.

* cited by examiner

1

METHOD AND APPARATUS FOR MSGA TRANSMISSION

TECHNICAL FIELD

Embodiments of the present application generally relate to wireless communication technology, especially to a method and an apparatus for MsgA transmission.

BACKGROUND

MsgA contains both physical random access channel (PRACH) and physical uplink shared channel (PUSCH). PRACH is used for preamble transmission. A PUSCH resource unit (PRU) is defined as the PUSCH occasion and demodulation reference signal (DMRS) port/DMRS sequence used for a MsgA payload transmission. MsgA PRACH, which is also known as "preamble," and MsgA PUSCH are associated with synchronization signal blocks (SSBs) for implicit transmission/reception spatial filter (i.e., beam) indication. Meanwhile, for available time instances of MsgA, they are associated with a beam index (i.e. SSB index) and a repetition index, which is in an order of firstly in increasing number of beam index within a beam group, and then repetition index, and the beam group index (i.e., SSB group index).

When uplink (UL) coverage recovery for a user equipment (UE) is necessary, time domain repetition for MsgA can be considered when 2-step random access channel (RACH) is adopted to increase the received power in the network side. However, the legacy technology has not adopted the mechanism of time domain repetition in view of several problems needed to be solved. For example, if multiple RACH occasions and PRU time instances for a specific beam are located in discrete time instances, then the time delay will be very long when a mechanism of time domain repetition is adopted. In addition, the repetition number for preamble and PRU may be different. How to make full use of available preambles and PRU resources in a period should be considered.

Thus, there is a need for further complementing and improving the technical solutions for MsgA transmission, e.g., preamble repetition and PRU repetition in MsgA transmission.

SUMMARY

One object of the embodiments of the present application is to provide technical solutions for MsgA transmission, especially, a time domain repetition mechanism for MsgA.

Some embodiments of the present application provide a method, including: receiving signaling information indicating at least one of a total number of a set of preambles in a period, a total number of a set of physical uplink shared channel (PUSCH) resource units (PRUs) in the period, a preamble repetition number in the period and a PRU repetition number in the period; and determining a mapping ratio of preambles to PRUs in the period based on the received signaling information.

In some embodiments, the method includes: determining an SSB group size for preambles, and associating indices of a plurality of SSBs with the set of preambles for the preamble repetition number by dividing the plurality of SSBs into one or more SSB groups for preambles based on the SSB group size for preambles. In some embodiments, the method includes: determining an SSB group size for PRUs, and associating indices of the plurality of SSBs with the set of PRUs for the PRU repetition number by dividing the plurality of SSBs into one or more SSB groups for PRUs based on the SSB group size for PRUs.

Some other embodiments of the present application provide a method, including: determining a preamble repetition number in a period and a SSB group size for preambles, and associating indices of a plurality of SSBs with a set of preambles in the period for the preamble repetition number by dividing the plurality of SSBs into one or more SSB groups for preambles based on the SSB group size for preambles.

Some yet other embodiments of the present application provide a method, including: determining a physical uplink shared channel (PUSCH) resource unit (PRU) repetition number in a period and a SSB group size for PRUs, and associating indices of the plurality of SSBs with a set of PRUs in the period for the PRU repetition number by dividing the plurality of SSBs into one or more SSB groups for PRUs based on the SSB group size for PRUs.

Some yet other embodiments of the present application provide a method, including: determining a downlink bandwidth part (BWP) identifier for a user equipment (UE), and applying the BWP identifier for at least one of downlink BWP for downlink transmission and uplink BWP for uplink transmission.

Some yet other embodiments of the present application provide a method, including: configuring signaling information indicating at least one of a total number of a set of preambles in a period, a total number of a set of physical uplink shared channel (PUSCH) resource units (PRUs) in the period, a preamble repetition number in the period and a PRU repetition number in the period; and determining a mapping ratio of preambles to PRUs in the period based on at least one of the total number of the set of preambles in the period, the total number of the set of PRUs in the period, the preamble repetition number in the period and the PRU repetition number in the period.

Some other embodiments of the present application provide an apparatus. The apparatus includes: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any of the abovementioned method.

Embodiments of the present application propose technical solutions for MsgA transmission, especially for the time domain repetition of MsgA. Meanwhile, embodiments of the present application consider the coexistence with legacy technology. Thus, embodiments of the present application will great facilitate the implementation of 5G NR including NR light.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
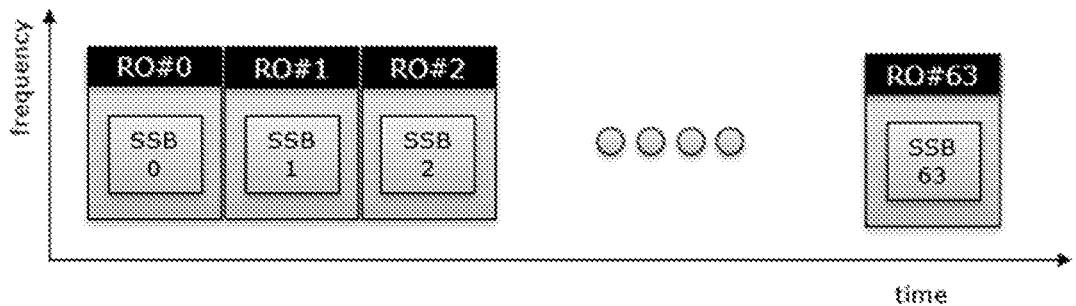
FIGS. 1-4 illustrate exemplary embodiments of mapping between SSBs and PRACH occasions depending on the specific setting of "msg1-FDM" and "ssb-perRACH-OccasionAndCBPreamblesPerSSB"

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

RACH and PRACH have very important functionality in wireless communication, especially in NR and long term evolution (LTE) (and in wideband code division multiple access (WCDMA) as well). The main purpose of PRACH/RACH can be described as: I) achieving uplink synchronization between user equipment (UE), e.g., a mobile phone and base station (BS), e.g., an eNB; and ii) obtaining the resource for Message 3 (Msg3). There are several different types of Msg3 depending on situations, e.g., Radio Resource Control (RRC) Connection Request.

In an exemplary scenario, when a UE is turned on, the UE will transmit a RACH/PRACH signal to the network side e.g., a BS. In a PRACH procedure, the PRACH signal is also called "PRACH preamble" (preamble). However, for a 2-step RACH procedure, there are only two steps i.e., transmitting MsgA which contains both preamble and PUSCH from a UE to the network side, e.g., a BS, and receiving MsgB in response to MsgA from the network side.

RACH/PRACH occasion (RO) is an area specified in time and frequency domain that are available for the transmission of preamble, and time domain RO is the smallest time domain resource unit for a preamble transmission. In LTE, all the possible preambles share the same RO specified by RRC message (e.g., SIB2), but in NR story gets more complicated. In NR, different SSBs are associated with different beams and a UE can select a certain beam (downlink spatial domain filter) and send a preamble on a RO associated with that beam (transmission and reception use the same spatial domain filter). NR R15 has defined a specific mapping relationship between SSBs (or SSB indices for identifying the SSBs) and ROs, so that the network side can figure out which SSB or beam that the UE has selected by detecting which RO the UE sent the preamble on. In other words, a RO is associated with an SSB or SSB index to implicitly indicate the selected beam for downlink transmission and if applied, as well as uplink transmission.

Specifically, the mapping between SSBs and ROs can be defined by two RRC parameters defined in TS 38.331 f60, i.e., "msg1-FDM" and "ssb-perRACH-OccasionAndCB-PreamblesPerSSB," wherein although the parameter "ssb-perRACH-OccasionAndCB-PreamblesPerSSB" is expressed in a single manner, it can express two sub-parameter values simultaneously, i.e., the value of "ssb-perRACH-Occasion" and the value of "CB-PreamblesPerSSB." According to TS 38.331 f60, "msg1-FDM" describes the number of RACH/PRACH transmission occasions FDMed in one time instance, that is, "msg1-FDM" specifies how many ROs are allocated in frequency domain (at the same location in time domain); "ssb-perRACH-Occasion" describes the number of SSBs per RO (time and frequency), and "CB-PreamblesPerSSB" describes the number of contention-based preambles per SSB, that is, "ssb-perRACH-OccasionAndCB-PreamblesPerSSB" specifies how many SSBs can be mapped to one RO and how many preambles can be mapped to a single SSB.

TS 38.213 f60 also describes the overall mapping logic as follows.

First, in increasing order of preamble indices within a single RO

Second, in increasing order of frequency resource indices for frequency multiplexed ROs Third, in increasing order of time resource indices for time multiplexed ROs within a RACH/PRACH slot Fourth, in increasing order of indices for RACH/PRACH slots Mapping between SSBs and ROs is periodically performed. Depending on the specific setting of the two parameters "msg1-FDM" and "ssb-perRACH-OccasionAndCB-PreamblesPerSSB," the number of time domain ROs for all the available SSBs in a mapping cycle can be one or more.

According to NR R15, the total number of available SSBs is 64. That is, there are 64 available SSBs indexed from 0 to 63, i.e., SSB 0-SSB 63. In each mapping cycle, ROs, which are also called "valid PRACH occasions" will be mapped to the 64 available SSBs. In the future, the total number of available SSBs may change, which will not affect the principle of the present application.

FIGS. 1-4 illustrate exemplary embodiments of mapping between SSBs and ROs depending on the specific setting of "msg1-FDM" and "ssb-perRACH-OccasionAndCBPreamblesPerSSB."

Specifically, in the embodiment shown in FIG. 1, both "msg1-FDM" and "ssb-perRACH-OccasionAndCBPreamblesPerSSB" are set as "1." That is, only one RO is allocated in frequency domain at the same location in time domain, and only one SSB (or SSB index) can be mapped to one RO. For example, RO #0, RO #1, RO #2 . . . RO #63 are respectively allocated in different locations in time domain, while in the same location in time domain, only one RO, e.g., RO #0, RO #1, RO #2 . . . or RO #63 is allocated in frequency domain. Only SSB 0 can be mapped to RO #0, only SSB 1 can be mapped to RO #1, only SSB 2 can be mapped to RO #2 . . . only SSB 63 can be mapped to RO #63.

Figure 2:
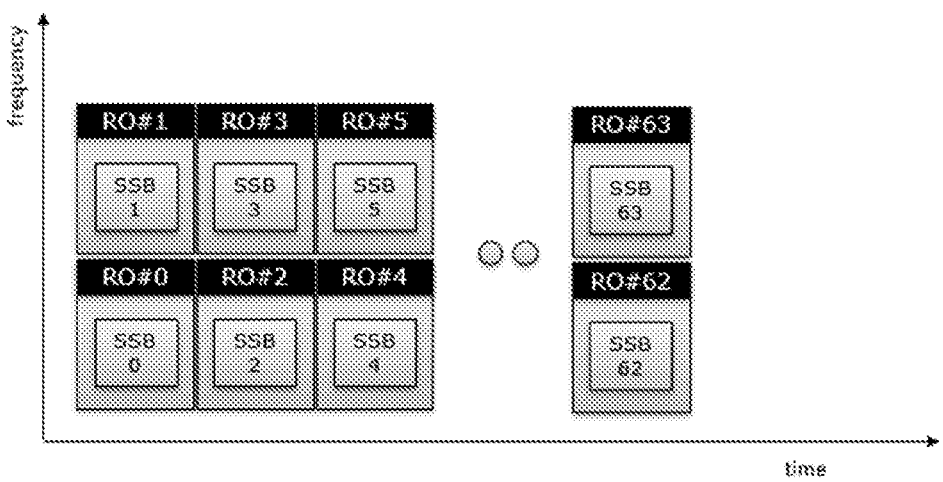

In the embodiment shown in FIG. 2, "msg1-FDM" is set as "2," while "ssb-perRACH-OccasionAndCBPreamblesPerSSB" is set as "1." That is, two ROs, are allocated at different locations in frequency domain while at the same location in time domain, and only one SSB (or SSB index) can be mapped to one RO. For example, RO #0 and RO #1 are allocated at different locations in frequency domain while at the same location in time domain, RO #2 and RO #3 are allocated in different locations in frequency domain while in the same location in time domain, which is similar to the following each two ROs, e.g., RO #4 and RO #5 . . . and RO #62 and RO #63. Only SSB 0 can be mapped to RO #0, and only SSB 1 can be mapped to RO #1, which is similar to the following SSBs, e.g., SSB 2, SSB 3, SSB 4, SSB 5 . . . SSB 62 and SSB 63.

Figure 3:
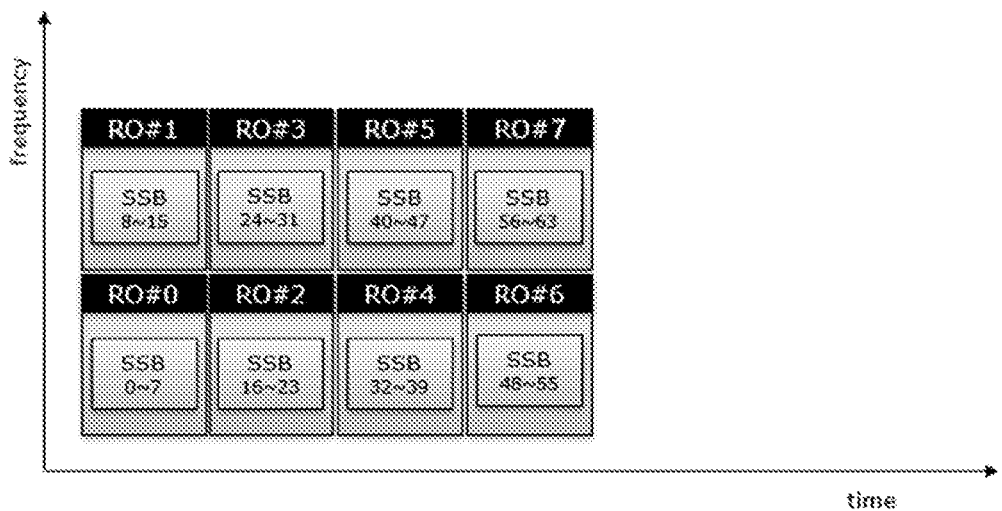

In the embodiment shown in FIG. 3, "msg1-FDM" is set as "2," while "ssb-perRACH-OccasionAndCBPreamblesPerSSB" is set as "8." That is, two ROs, are allocated at different locations in frequency domain while at the same location in time domain, and 8 SSBs (or SSB indices) can be mapped to one RO. For example, RO #0 and RO #1 are allocated at different locations in frequency domain while in the same location in time domain, RO #2 and RO #3 are allocated in different locations in frequency domain while in the same location in time domain, which is similar to the following each two ROs, e.g., RO #4 and RO #5, and RO #6 and RO #7. SSB 0-7 can be mapped to RO #0, SSB 8-15 can be mapped to RO #1, SSB 16-23 can be mapped to RO #2, SSB 24-31 can be mapped to RO #3, SSB 32-39 can be mapped to RO #4, SSB 40-47 can be mapped to RO #5, SSB 48-55 can be mapped to RO #6, and SSB 56-63 can be mapped to RO #7.

Figure 4:
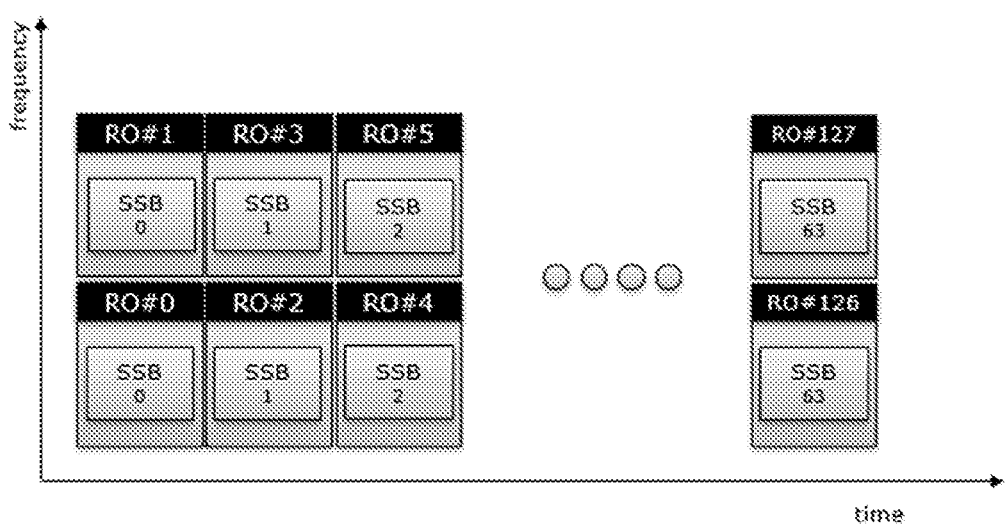

In the embodiment shown in FIG. 4, "msg1-FDM" is still set as "2," while "ssb-perRACH-OccasionAndCBPreamblesPerSSB" is set as "½." That is, two ROs, are allocated at different locations in frequency domain while at the same location in time domain, and one SSB (or SSB index) can be mapped to two ROs. Thus, for 64 SSBs, there are 128 ROs to be mapped. For example, RO #0 and RO #1 are allocated at different locations in frequency domain while at the same location in time domain, RO #2 and RO #3 are allocated at different locations in frequency domain while at the same location in time domain, which is similar to the following each two ROs, e.g., RO #4 and RO #5 . . . RO #126 and RO #127. Each SSB can mapped to the two ROs in the same time domain, e.g., SSB 0 can be mapped to RO #0 and RO #1, SSB 1 can be mapped to RO #2 and RO #3, SSB 2 can be mapped to RO #4 and RO #5 . . . SSB 63 can be mapped to RO #126 and RO #127.

According to some embodiments of the present application, when uplink coverage recovery for a UE is necessary, time domain repetition for MsgA can be performed when a 2-step RACH procedure is adopted to increase the received power in the network side.

Figure 5:
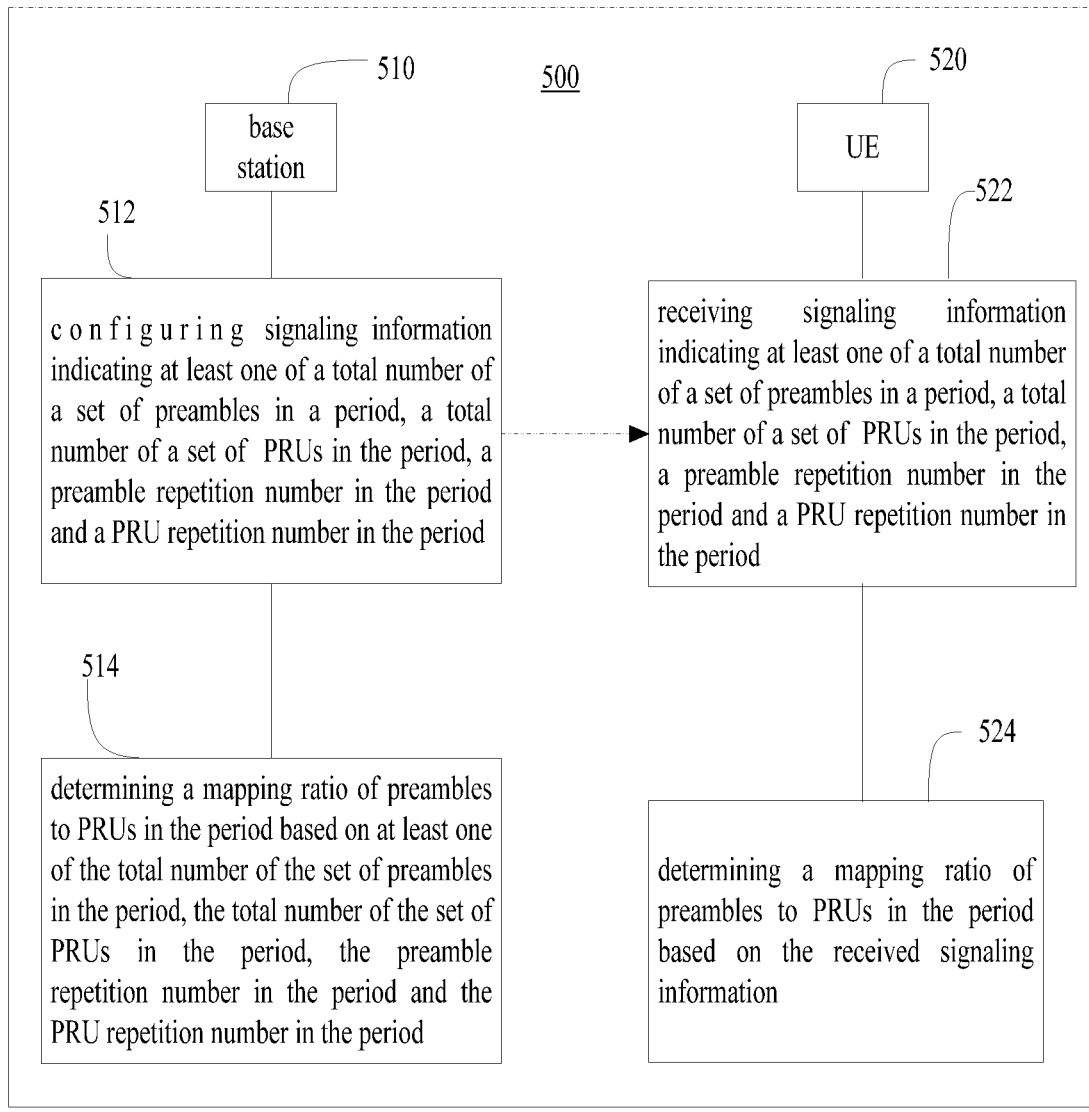
FIG. 5 illustrates an exemplary method for MsgA transmission performed in a wireless communication system according to some embodiments of the present application.

For example, FIG. 5 illustrates an exemplary method for MsgA transmission performed in a wireless communication system 500 according to some embodiments of the present application, wherein time domain repetition for MsgA can be performed during a 2-step RACH procedure.

As shown in FIG. 5, the wireless communication system 500 can include at least one base station 510 and at least one UE 520. For simplicity and clearness, only one base station 510 and one UE 520 under the coverage of the base station 510 are shown. Persons skilled in the art should understand that the base station 510 and the UE 520 shown in FIG. 5 can also be applied in other communication scenarios and incorporate with other base stations 510 and UEs 520. In addition, a method for MsgA transmission in the network side, e.g., the base station 510 and a method for MsgA transmission in the terminal side, e.g., the UE 520 are respectively illustrated, they can be performed in other network elements with the same or similar functionality.

Specifically, a base station 510 can configure parameters for MsgA transmission. For example, the base station 510 can be configured to perform a method for MsgA transmission including: in step 512, determining (configuring) at least one of a total number of a set of preambles in a period, a total number of a set of PRUs in the period, a preamble repetition number in the period and a PRU repetition number in the period. "Preamble repetition" can also be called "PRACH repetition," and accordingly, "preamble repetition number" can be also called "PRACH repetition number." The period can be a SSB to RO association pattern period in some embodiments of the present application.

According to some embodiments of the present application, a total number of a set of preambles in a period can be determined by indexing preambles in the following order: first in increasing order of preamble indices within a single RO, second in increasing order of frequency resource indices for frequency multiplexed ROs, third in increasing order of time resource indices for time multiplexed ROs within a RACH/PRACH slot, and fourth in increasing order of indices for RACH/PRACH slots.

According to some embodiments of the present application, a total number of a set of PRUs in a period can be determined by indexing PRUs in the following order: first, in increasing order of frequency resource indexes for frequency multiplexed ROs; second, in increasing order of DMRS indices within a single PUSCH occasion (port first, sequence second); third, in increasing order of time resource indices for time multiplexed PUSCH occasions within a PUSCH slot; and fourth, in increasing order of indices for PUSCH slots.

The base station 510 can be configured to transmit signaling information to the UE 520 to explicitly or implicitly indicate at least one of a total number of a set of preambles in the period, a total number of a set of PRUs in the period, a preamble repetition number in the period and a PRU repetition number in the period. For example, the base station 510 can also configure and transmit other related parameters, i.e., the number of preamble per SSB etc. The base station 510 can calculate the number of preambles per PRU based on the number of preambles and the number of PRUs in a period. Based on the number of preamble per SSB and other related parameters, the number of SSBs for preambles in a time instance can be determined. Based on the number of preambles per SSB, the number of preambles per PRU, and other related parameters, the number of SSBs for PRU in a time instance can be determined.

A method for MsgA performed in the base station 510 can also include: in step 514, determining a mapping ratio of preambles to PRUs in the period based on at least one of the total number of the set of preambles, the total number of the set of PRUs, the preamble repetition number and the PPRU repetition number. A mapping ratio of preambles to PRUs means how many consecutive PRACH preambles are mapped to one PRU.

According to some embodiments of the present application, the mapping ratio of preambles to PRUs is a ceil of a ratio of the total number of the set of preambles to the total number of the set of PRU numbers for MsgA in the period. That is, the mapping ratio can be determined based on:

R-association=ceil(N-preamble/N-PRU)  Equation (1)

Wherein, R-association is the mapping ratio of preambles to PRUs, N-preamble is the total number of the set of preambles in a period, and N-PRU is the total number of the set of PRUs in a period.

For a method for MsgA transmission performed in the UE 520, it can include: in step 522, receiving signaling information indicating at least one of a total number of a set of preambles in a period, a total number of a set of PRUs in the period, a preamble repetition number in the period and a PRU repetition number in the period. Based on the received signaling information, the UE 520 can also be configured to: in step 524 determine a mapping ratio of preambles to PRUs in the period. The rule of determining the mapping ratio in the base station 510 and that in the UE 520 should be the same. The signaling information may explicitly or implicitly indicate these parameters, which may be newly defined in the present application or has been defined in legacy technology. For example, the signaling information may indicate nrMsgAPO-FDM (the number of msgA PUSCH occasions FDMed in one time instance), PreamblesPerRO (the preamble number per RO), and preamblesPerSSB (the preamble number per SSB). The UE 520 can determine the total number of beams in a PRACH time instance based on nrMsgAPO-FDM, PreamblesPerRO, and preamblesPerSSB, i.e., N-preamble=nrMsgAPO-FDM*PreamblesPerRO/preamblesPerSSB. In some embodiments of the present application, the signaling information may directly indicate or implicitly indicate the mapping ratio. For example, the signaling information may indicate nrMsgAPO-FDM, DMRSResourcesPerPRU (the DMRS resource number per RO, containing both DMRS ports and sequence, which is indicated by multiplexing msgAPUSCHDMRSCDMgroup, msgAPUSCHNrOfPort and nrofDMRS-Sequences), the mapping ratio and PreamblesPerSSB. The UE 520 can determine the total number of beams in a PRU time instance based on these parameters, e.g., N-PRU=(nrMsgAPO-FDM*DMRSResourcesPerPRU*M)/PreamblesPerSSB. In some embodiments of the present application, the UE 520 may also receive signaling information explicitly or implicitly indicating other parameters for MsgA transmission.

To transmit MsgA, both preamble and PRU will be associated with SSB (also be called mapping) for implicitly indicating the beam used by the UE 520 so that the network side can detect them in correct beam. The association of preamble with SSB and PRU with SSB are applied by the same method in the base station 510 and UE 520 except that a base station 510 can explicitly or implicitly indicate signaling information to a UE 520 for MsgA transmission while the UE 520 needs to determine parameters from the explicit or implicit signaling information. In addition, legacy association (mapping) related rules and parameters except that newly defined in this application can also be adaptive, and will not be illustrated in detail.

Specifically, according to some embodiments of the present application, a method for MsgA transmission can also include determining a SSB group size for preambles, and associating indices of a plurality of SSBs with the set of preambles for a preamble repetition number by dividing the plurality of SSBs into one or more SSB groups for preambles based on the SSB group size for preambles. The base station 510 can transmit a signaling to explicitly indicate the SSB group size to the UE 520, e.g., a radio resource control (RRC) signaling in some embodiments of the present application. The UE 520 can determine the SSB group size for preambles based on the explicit signaling. In some other embodiments of the present application, the base station 510 may only indicate related parameters, rather than transmitting an explicit signaling for indicating the SSB group size. For example, the base station 510 can transmit an amount of SSBs for preambles in a time instance. The UE 520 can determine the SSB group size for preambles based on an amount of SSBs for preambles in a time instance.

Associating the indices of the plurality of SSBs with the set of preambles can be performed in the following order:
for the plurality of SSBs:
first, in increasing order of SSB indices within an SSB group;
then, in increasing order of preamble repetition indices; and
then, in increasing order of SSB group indices; and
for the set of preambles:
first, in increasing order of code domain resource indices;
then, in increasing order of frequency domain resource indices; and
then, in increasing order of time domain resource indices.

Each SSB group for preambles may have the same SSB amount in the case that the plurality of SSBs can be evenly divided into each SSB group for preambles. In some embodiments of the present application, one SSB group, e.g., the last one may have a smaller SSB amount due to the plurality of SSBs are not enough to be evenly divided.

According to some embodiments of the present application, a method for MsgA transmission can also include determining an SSB group size for PRUs, and associating indices of a plurality of SSBs with the set of PRUs for a PRU repetition number by dividing the plurality of SSBs into one or more SSB groups for PRUs based on the SSB group size for PRUs. The base station 510 can transmit a signaling to explicitly indicate the SSB group size to the UE 520, e.g., a RRC signaling in some embodiments of the present application. The UE 520 can determine the SSB group size for PRUs based on the explicit signaling. In some other embodiments of the present application, the base station 510 may only indicate related parameters, rather than transmitting an explicit signaling for indicating the SSB group size. For example, the base station 510 can transmit some parameters for calculating an amount of SSBs for PRUs in a time instance. The UE 520 can determine the SSB group size for PRUs based on an amount of SSBs for PRUs in a time instance.

Associating the indices of the plurality of SSBs with the set of PRUs can be performed in the following order:
for the plurality of SSBs:
first, in increasing order of SSB indices within an SSB group;
then, in increasing order of PRU repetition indices; and
then, in increasing order of SSB group indices; and
for the set of PRUs:
first, in increasing order of frequency domain resource indices;
then, in increasing order of DMRS resource indices; and
then, in increasing order of time domain resource indices.

Similarly, each SSB group for PRUs may have the same SSB amount in the case that the plurality of SSBs can be evenly divided into each SSB group for PRUs. In some embodiments of the present application, one SSB group, e.g., the last one may have a smaller SSB amount due to the plurality of SSBs are not enough to be evenly divided.

Associating SSBs with preambles and associating SSBs with PRUs can be independently performed or combined together. The SSB group size for preambles and the SSB group size for PRUs can be the same or different. In some embodiments of the present application, the network side can transmit one RRC signaling indicating both the SSB group size for preambles and the SSB group size for PRUs. In some embodiments of the present application, the network side can transmit different RRC signaling to separately indicate the SSB group size for preambles and the SSB group size for PRUs. When the SSB group size for preambles and the SSB group size for PRUs are the same, they can be a multiple of the lowest common multiple of an associated SSB amount of preambles and PRUs in a time instance, e.g., the lowest common multiple or the double of the lowest common multiple.

Figure 6A:
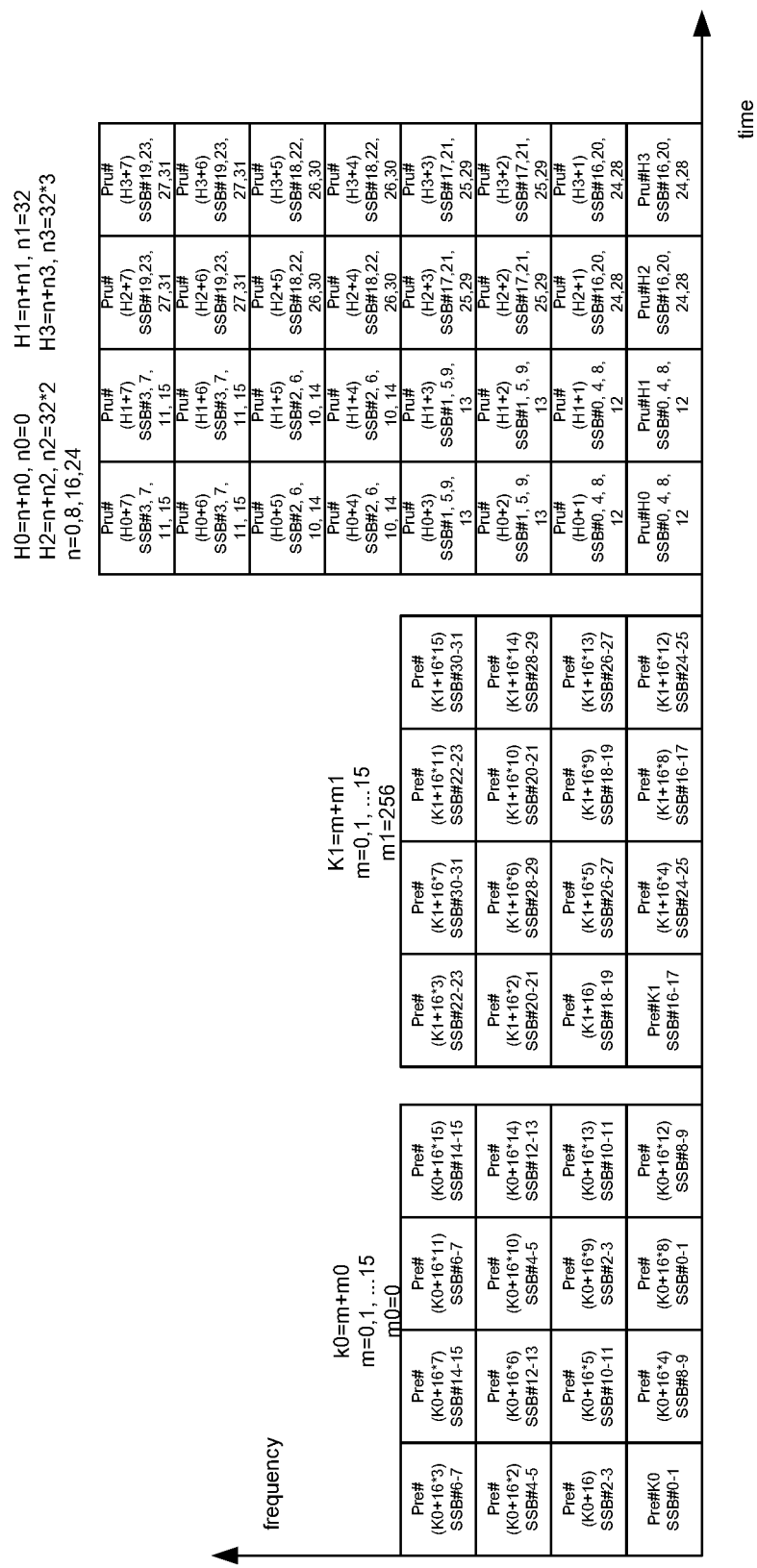
FIG. 6A illustrates an exemplary association among SSBs, preambles and PRUs achieved by a method for MsgA transmission according to some embodiments of the present application.

FIG. 6A illustrates an exemplary association among SSBs, preambles and PRUs achieved by a method for MsgA transmission according to some embodiments of the present application.

Specifically, in FIG. 6A, the preamble repetition number and the PRU repetition number are the same, and both are 2. The preamble number per SSB (a total number of preambles per SSB) is 8. The SSB group size for preambles and that for PRUs are configured to be the same, and are the multiple of the lowest common multiple of an associated SSB amount of preambles (i.e., 8) and an associated SSB amount of PRUs in a time instance (i.e., 16), i.e., 16. Given those, the total number of preambles in a period is: nrOfPremablePerRO*msg1-FDM*nrOfTimeDomainRO=16*4*8=512. Wherein nrOfPremablePerRO is the number of preamble in a PRACH occasion, and nrOfTimeDomainRO is the total number of time instances in a period. The total number of PRUs in a period is: nrMsgAPO-FDM*DMRSResourcesPerPRU*nrOfTimeDomainPRU=8*4*4=128. Wherein nrOfTimeDomainPRU is the total number of PRU time instances in a period. Thus, the mapping ratio of preambles to PRUs is 512/128=4. That is, four preambles are associated with one PRU.

Based on the SSB group size for preambles, i.e., 16, and the associated SSB amount of preambles in a time instance is 8, 2 RO time instances are necessary for SSB to RO association for 16 SSBs. So the first and the second RO time instances are used for association with SSB #0-15 (the first RO time instance is for SSB #0-7, and the second RO time instance is for SSB #8-15). Based on the preamble repetition number, i.e., 2, the SSB to RO association will be repeated, that is, the third and fourth RO time instance will be also associated with SSB #0-15 (the third RO time instance is for SSB #0-7, and fourth RO time instance is for SSB #8-15). RO to SSB association for SSB #16-31 can be performed continuously in time domain in the same way. So, the fifth to eighth time instances are used for SSB #16-31.

Regarding PRU time instances, the associated SSB amount of PRUs in a time instance is 16. Based on the SSB group size for PRU, i.e. 16, it will be determined that one PRU time instance is necessary for SSB to PRU association for 16 SSBs. So, the first PRU time instance is used for SSB #0-15. Based on the repetition number for PRU is 2, the second PRU time instance is also used for SSB #0-15. Association between PRUs and SSB #16-31 can be performed continuously in time domain in the same way. Then, the third PRU time instance is used for SSB #16-31, and the fourth PRU time instance is also used for SSB 16-31 considering the PRU repetition number being 2.

Figure 6B:
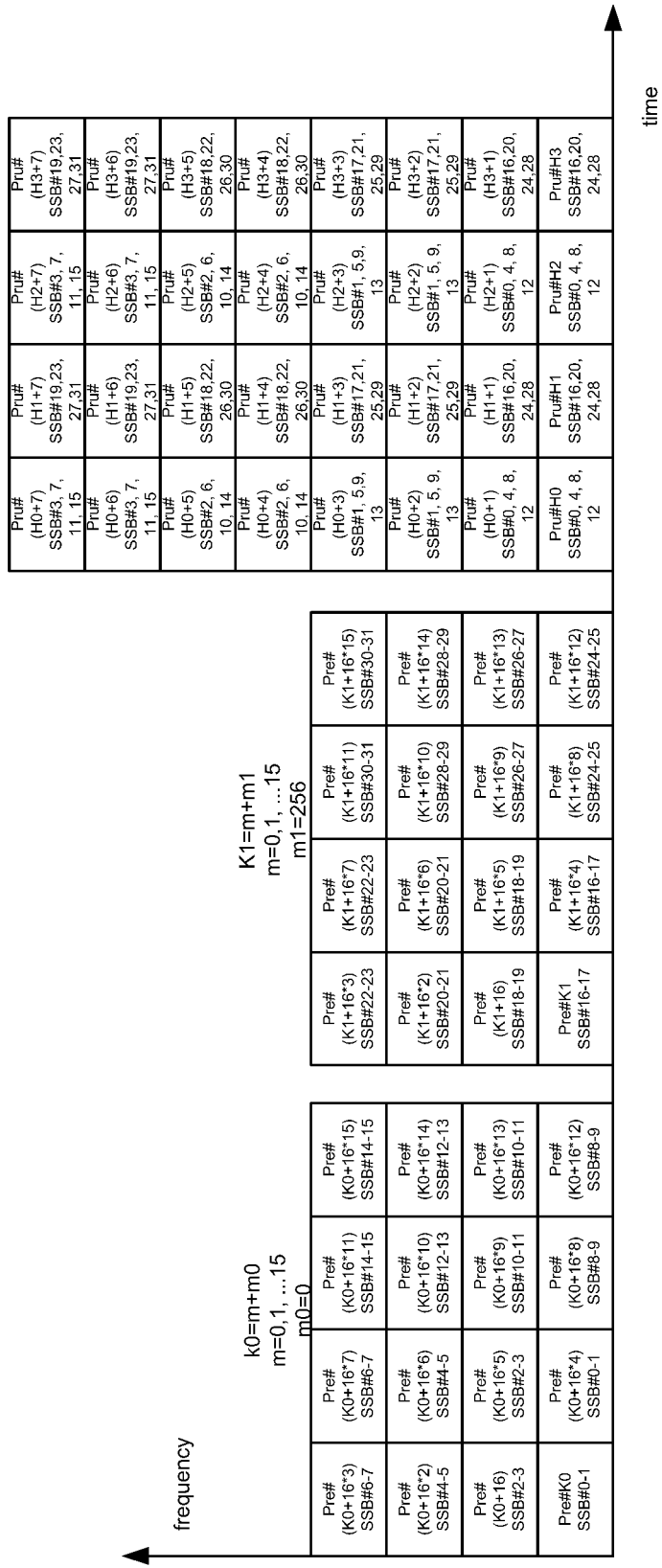
FIG. 6B illustrates an exemplary association among SSBs, preambles and PRUs achieved by a method for MsgA transmission according to some other embodiments of the present application.

FIG. 6B illustrates an exemplary association among SSBs, preambles and PRUs achieved by a method for MsgA transmission according to some other embodiments of the present application.

Specifically, in FIG. 6B, the preamble repetition number and the PRU repetition number are the same, and both are still 2. The preamble number per SSB (a total number of preambles per SSB) is still 8. However, the SSB group size for preamble and that for PRUs are configured to be different. The SSB group size for preamble is 8, while the SSB group size for PRU is 32. Given those, based on the same determination procedure as that in FIG. 6A, the mapping ratio of preambles to PRUs is still 4. That is, four preambles are associated with one PRU.

Based on the SSB group size for preamble, i.e., 8, and the associated SSB amount of preambles in a time instance is 8, one RO time instance is necessary for SSB to RO association for 8 SSBs. Thus, considering the preamble repetition number, i.e., 2, the first and the second RO time instances are used for association with SSB #0-7. RO to SSB association for SSB #8-31 can be performed continuously in time domain in the same way. So, third and fourth time instances are associated with SSB #8-15, the fifth to sixth time instance are associated with SSB #16-23, and the seventh to eighth time instances are associated with SSB #24-31.

Regarding PRU time instances, the associated SSB amount of PRUs in a time instance is 16. Based on the SSB group size for PRUs, i.e. 32, it will be determined that two PRU time instances are necessary for SSB to PRU association for 32 SSBs. So, the first PRU time instance is associated with SSB #0-15, and the second PRU time instance is associated with SSB #16-31. Considering the PRU repetition number, i.e., 2, the SSB to PRU association will be repeated, and thus the third PRU time instance is associated with SSB #0-15, and the fourth PRU time instance is also associated with SSB #16-31.

Figure 6C:
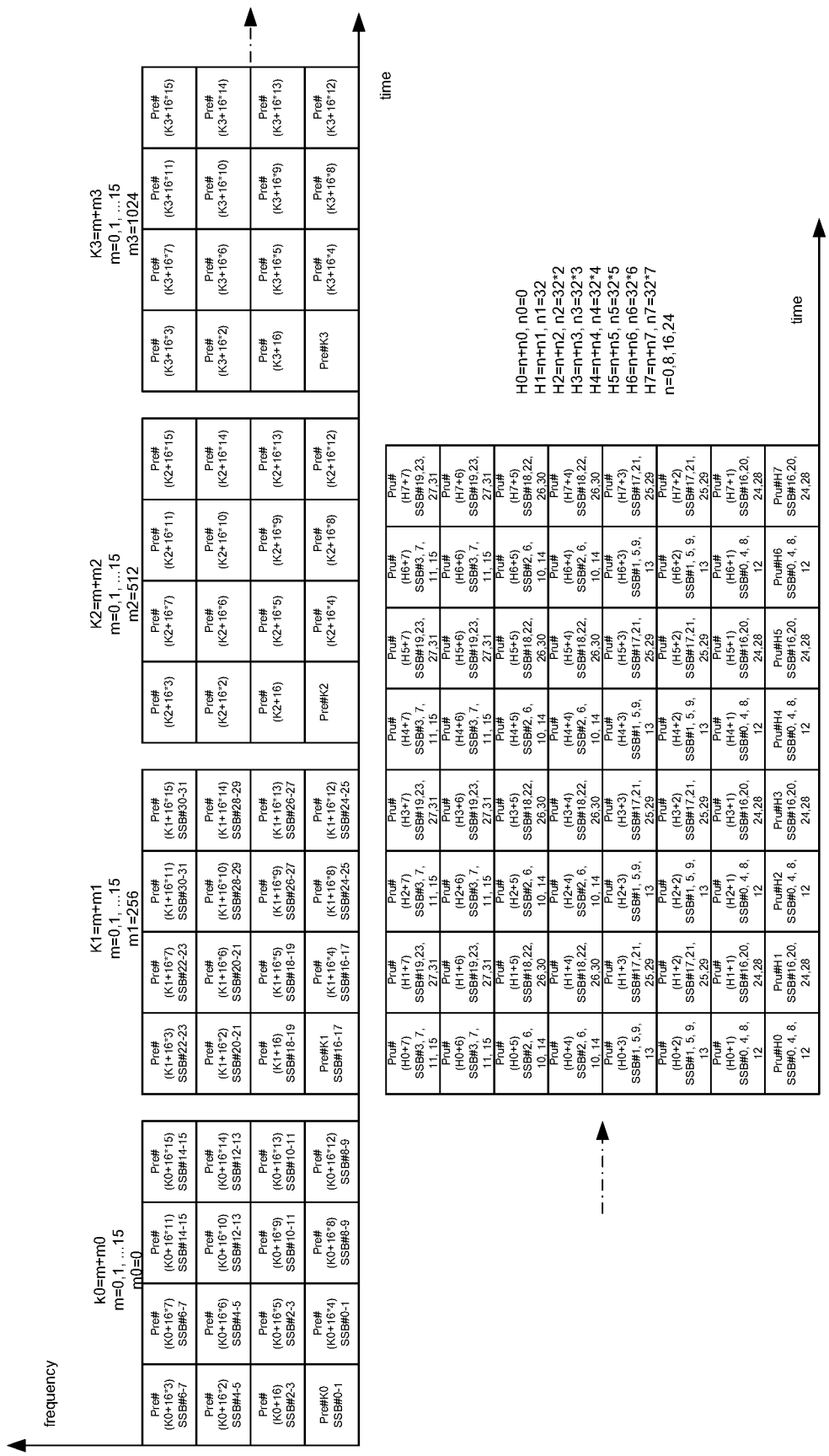
FIG. 6C illustrates an exemplary association among SSBs, preambles and PRUs achieved by a method for MsgA transmission according to yet some other embodiments of the present application.

FIG. 6C illustrates an exemplary association among SSBs, preambles and PRUs achieved by a method for MsgA transmission according to yet some other embodiments of the present application.

Specifically, in FIG. 6C, preamble repetition number and PRU repetition number are separately configured, and the SSB group size for preambles and that for PRUs are also separately configured. The repetition number for preamble is 2, and the repetition number for PRU is 4. The SSB group size for preamble is 8, and the SSB group size for PRU is 32. Similarly, the total number of preambles in a period is:

nrOfPremablePerRO*msg1-FDM*nrOfTimeDomainRO=16*4*16=1024. The total number of PRUs in a period is: nrMsgAPO-FDM*DMRSResourcesPerPRU*nrOfTimeDomainPRU=8*4*8=256. Thus, the mapping ratio of preambles to PRUs is 1024/256=4. That is, four preambles are associated with one PRU. Thus, the first RO time instance is associated with SSB #0-7, the second RO time instance is also associated with SSB #0-7, the third RO time instance is associated with SSB #8-15 and so on. The first two PRU time instances are associated with SSB #0-31, the third and fourth PRU time instances are associated with SSB #0-31, the fifth and sixth PRU time instances are also associated with SSB #0-31, and so on. The ninth to sixteenth RO time instances can be used for other uplink transmissions from this UE or other UE.

Mapping ratio of preambles to PRUs can be determined in other manners. For example, the preamble repetition number and PRU repetition number can also be considered besides the total number of preambles and the total number of PRUs in a period when determining the mapping ratio. In some embodiments of the present application, the mapping ratio can be determined based on:

$$R\text{-association}=\text{ceil}(N\text{-preamble}*N_{re}\text{-preamble}/N\text{-PRU}/N_{re}\text{-PRU}) \quad \text{Equation (2)}$$

Wherein, R-association is the mapping ratio of preambles to PRUs, N-preamble is the total number of a set of preambles in a period, Nre-preamble is a preamble repetition number, N-PRU is the total number of a set of PRUs in the period and Nre-PRU is a PRU repetition number.

In the case that Nre-preamble is larger than or equal to Nre-PRU, the number of SSBs for preamble in a time instance can be determined based on the number of preamble per SSB and the number of FDMed ROs in a time instance. The number of SSBs for PRU in a time instance can be determined based on the number of preambles per SSB, the number of preambles per PRU and the number of FDMed PRUs in a time instance as the above. However, in the case that Nre-preamble is smaller than Nre-PRU, the number of preambles per SSB will be changed to be ceil (Nre-PRU/Nre-preamble) multiple of the total number of preambles per SSB (a preamble number per SSB) determined in the case that there is no repetition for preamble and PRU. Except for determining the number of preambles per SSB, no other substantial difference between the methods applying the mapping ratio determined by the above two manners. That is, the above illustrated association methods can also be adaptive.

Figure 7A:
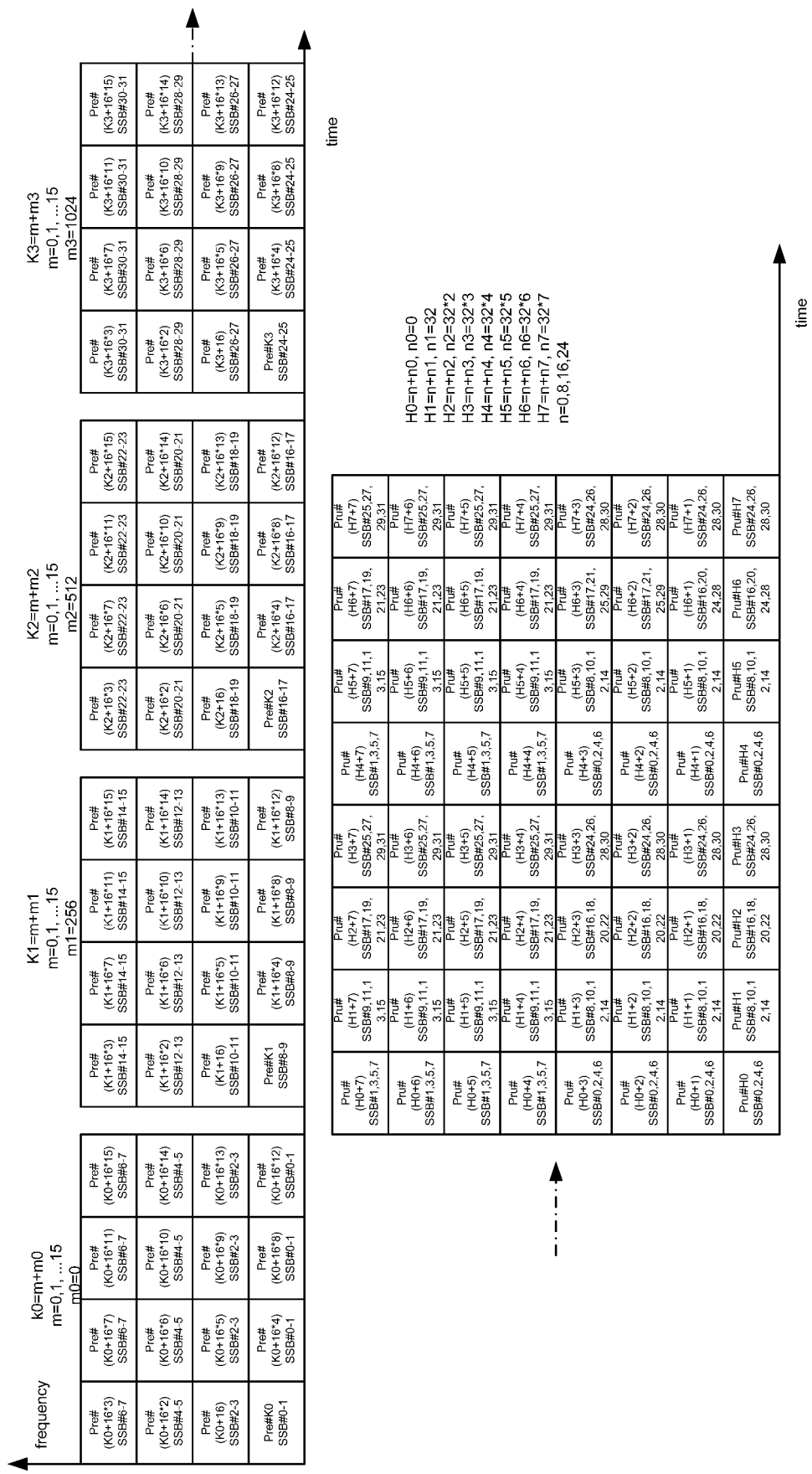
FIG. 7A illustrates an exemplary association among SSBs, preambles and PRUs achieved by a method for MsgA transmission according to some embodiments of the present application.

FIG. 7A illustrates an exemplary association among SSBs, preambles and PRUs achieved by a method for MsgA transmission according to some embodiments of the present application.

In FIG. 7A, the repetition number for preamble is 4, and the repetition number for PRU is 2. nrOfPremablePerRO, i.e., the number of preamble in a PRACH occasion is 16, msg1-FDM is 4, and nrOfTimeDomainRO, i.e., the total number of RO time instances in a period is 16. Thus, the total number of preambles in a period is: nrOfPremablePerRO*msg1-FDM*nrOfTimeDomainRO=16*4*16=1024. nrOfTimeDomainPRU, i.e., the total number of PRU time instances in a period is 8, DMRSResourcesPerPRU is 4 and nrMsgAPO-FDM is 8. The total number of PRUs in a period is: nrMsgAPO-FDM*DMRSResourcesPerPRU*nrOfTimeDomainPRU=8*4*8=256. Thus, the mapping ratio of preambles to PRUs is (1024*2)/(256*4)=2. That is, 2 preambles are associated with one PRU. The number of preambles per SSB is configured to be 8, and there are 16 preambles in a RO. So there are 2 SSBs associated with a RO. Since the number of FDMed ROs in a time instance (msg1-FDM) is 4, the associated SSB amount of preambles in a time instance is 2*4=8. Based on the explicit or implicit indicated SSB group size for preambles, i.e., 8, one RO time instance is necessary for SSB to RO association for 8 SSBs. Thus, the first RO time instance is used for association with SSB #0-7. Based on the preamble repetition number, i.e. 4, the SSB to RO association will be repeated, that is, the $2^{nd}$, $3^{rd}$ and $4^{th}$ RO time instances will be also associated with SSB #0-7 (the $2^{nd}$ RO time instance is for association with SSB #0-7, the $3^{rd}$ RO time instance is for association with SSB #0-7, and the $4^{th}$ RO time instance for association with SSB #0-7). RO to SSB association for SSB #8-15 will be performed continuously in time domain. So the $5^{th}$ to $8^{th}$ time instances are used for SSB #8-15, the $9^{th}$ to $12^{th}$ time instances are used for SSB #16-23, and the $13^{th}$ to $16^{th}$ time instances are used for SSB #24-31.

Regarding PRU time instances, the number of preambles per SSB is configured to be 8, and the mapping ratio between preamble and PRU is 2, that is each PRU is associated with 2 preambles. Thus, 4 PRUs are necessary for 8 preambles, which are related to one SSB. So, PRU #0, 1, 2 and 3 are associated with SSB #0 and have DMRS resource index #0. PRU #4, 5, 6 and 7 are associated with SSB #1 and have DMRS resource index #0. PRU #8, 9, 10 and 11 (the same time frequency resource as PRU #0, 1, 2 and 3, while different DMRS resource index, i.e., DMRS resource index #1) are associated with SSB #2. PRU #12, 13, 14 and 15 (the same time frequency resource as PRU #4, 5, 6 and 7, while different DMRS resource index, i.e., DMRS resource index #1) are associated with SSB #3. PRU #16, 17, 18 and 19 (the same time frequency resource as PRU #0, 1, 2 and 3, while different DMRS resource index, e.g., DMRS resource index #2) are associated with SSB #4. PRU #20, 21, 22 and 23 (the same time frequency resource as PRU #4, 5, 6 and 7, while different DMRS resource index, i.e., DMRS resource index #2) are associated with SSB #5. PRU #24, 25, 26 and 27 (the same time frequency resource as PRU #0, 1, 2 and 3, while different DMRS resource index, i.e., DMRS resource index #3) are associated with SSB #6. PRU #28, 29, 30 and 31 (the same time frequency resource as PRU #4, 5, 6 and 7, while different DMRS resource index, i.e., DMRS resource index #3) are associated with SSB #7. The number of PRUs in a PRU time instance is: nrMsgAPO-FDM*nrofDMRS-Ports*nrofDMRS-Sequences=8*2*2=32. Each PRU is associated with 2 preambles based on the mapping ratio, so there are 32*2=64 associated preambles in a PRU time instance. Since each SSB is associated with 8 preambles, there are 64/8=8 associated SSBs in a PRU time instance. So the associated SSB amount of PRUs in a PRU time instance is 8. Based on the SSB group size for PRU is 32, it will be determined that 4 (i.e., 32/8) PRU time instances are necessary for SSB with PRU association for 32 SSBs. So the $1^{st}$, $2^{nd}$, $3^{rd}$, $4^{th}$ PRU time instances are used for association with SSB #0-31 (the $1^{st}$ PRU time instance is for SSB #0-7, the $2^{nd}$ PRU time instance is for SSB #8-15, the $3^{rd}$ PRU time instance is for SSB #16-23, and the $4^{th}$ PRU time instance is for SSB #24-31). Based on the PRU repetition number is 2, the $5^{th}$ to $8^{th}$ PRU time instances are also used for association with SSB #0-31.

Figure 7B:
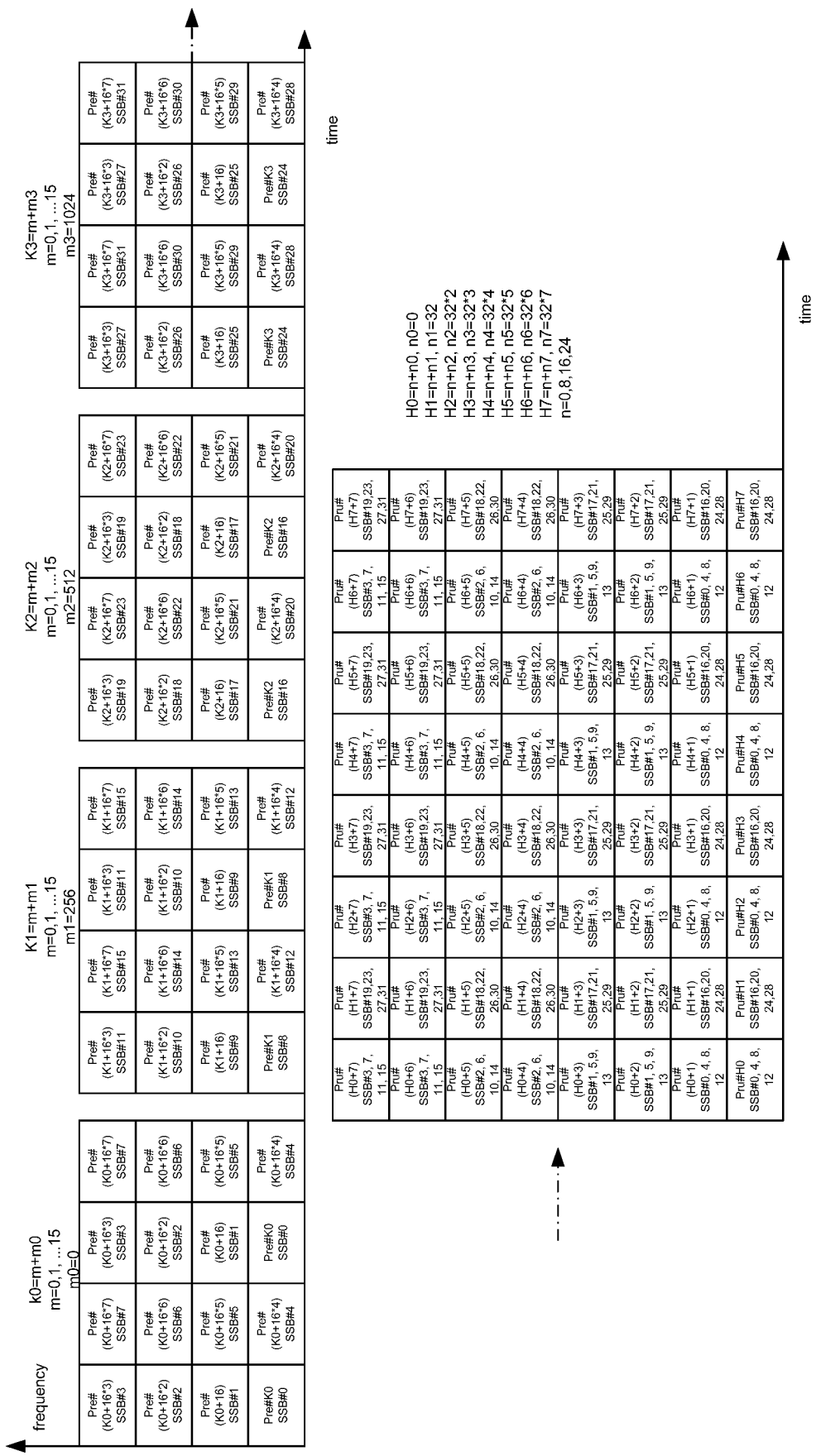
FIG. 7B illustrates an exemplary association among SSBs, preambles and PRUs achieved by a method for MsgA transmission according to some embodiments of the present application.

FIG. 7B illustrates an exemplary association among SSBs, preambles and PRUs achieved by a method for MsgA transmission according to some embodiments of the present application.

In FIG. 7B, the repetition number for preamble is 2, and the repetition number for PRU is 4. nrOfPremablePerRO, i.e., the number of preamble in a PRACH occasion is 16, msg1-FDM is 4, and nrOfTimeDomainRO, i.e., the total number of RO time instances in a period is 16. Thus, the total number of preambles in a period is: nrOfPremablePerRO*msg1-FDM*nrOfTimeDomainRO=16*4*16=1024. nrOfTimeDomainPRU, i.e., the total number of PRU time instances in a period is 8, DMRSResourcesPerPRU is 4 and nrMsgAPO-FDM is 8. The total number of PRUs in a period is: nrMsgAPO-FDM*DMRSResourcesPerPRU*nrOfTimeDomainPRU=8*4*8=256. Thus, the mapping ratio of preambles to PRUs is (1024*4)/(256*2)=8. That is, 8 preambles are associated with one PRU. The number of preambles per SSB without repetition is configured to be 8. In this case, the number of preambles per SSB is increased to be 2 times of the corresponding value without repetition, wherein 2 is the ratio between the PRU repetition number and the preamble repetition number. So the number of preambles per SSB is 8*2=16. There are 16 preambles in a RO. So there is 1 SSB associated with a RO. Since the number of FDMed ROs in a time instance (msg1-FDM) is 4, the associated SSB amount of preambles in a time instance is 1*4=4. Based on the explicit or implicit indicated SSB group size for preambles, i.e., 8, two RO time instance is necessary for SSB to RO association for 8 SSBs. Thus, the first RO time instance is used for association with SSB #0-3 and the $2^{nd}$ RO time instance is used for association with SSB #4-7. Based on the preamble repetition number, i.e. 2, the SSB to RO association will be repeated. That is, the $3^{rd}$ and $4^{th}$ RO time instances will also be associated with SSB #0-7 (the $3^{rd}$ RO time instance is for association with SSB #0-3, and the $4^{th}$ RO time instance is for association with SSB #4-7). RO to SSB association for SSB #8-15 will be performed continuously in time domain. So the $5^{th}$ to $8^{th}$ time instances are used for association with SSB #8-15, the $9^{th}$ to $12^{th}$ time instances are used for association with SSB #16-23, and the $13^{th}$ to $16^{th}$ time instances are used for association with SSB #24-31.

Regarding PRU time instances, the number of preambles per SSB is updated to be 16, and the mapping ratio between preamble and PRU is 8, that is each PRU is associated with 8 preambles. Thus, 2 PRUs is necessary for 16 preambles, which are related to one SSB. So, PRU #0, 1 are associated with SSB #0. PRU #2, 3 are associated with SSB #1, PRU #4, 5 are associated with SSB #2. PRU #6, 7 are associated with SSB #3. PRU #8, 9 (the same time frequency resource as PRU #0, 1, while different DMRS resource index) are associated with SSB #4. The number of PRUs in a PRU time instance is: nrMsgAPO-FDM*nrofDMRS-Ports*nrofDMRS-Sequences=8*2*2=32. Each PRU is associated with 8 preambles based on the mapping ratio, and thus there are 32*8=256 associated preambles in a PRU time instance. Since each SSB is associated with 16 preambles, there are 256/16=16 associated SSBs in a PRU time instance. So the associated SSB amount of PRUs in a PRU time instance is 16. Based on the SSB group size for PRU being 32, it will be determined that 2 (i.e., 32/16) PRU time instances are necessary for SSB to PRU association for 32 SSBs. So the $1^{st}$, $2^{nd}$ PRU time instances are used for association with SSB #0-31 (the $1^{st}$ PRU time instance is for SSB #0-15, the $2^{nd}$ PRU time instance is for SSB #16-31). Based on the PRU repetition number is 4, the $3^{rd}$ to $4^{th}$ PRU time instances are also used for association with SSB #0-31, the $5^{th}$ to $6^{th}$ PRU time instances are also used for association with SSB #0-31, and the $7^{th}$ to $8^{th}$ PRU time instances are also used for association with SSB #0-31. The association order for associating the indices of the plurality of SSBs with the set of preambles and the association order for associating the indices of the plurality of SSBs with the set of PRUs can be various dependent on different application requirements. For example, with time domain last mapping manner, all frequency resources will be used by a single SSB, which may render multiplexing multiple SSBs in a single time instance impossible. The network side, e.g., the base station 510 may explicitly indicate a UE 520 that the association order(s) will change, e.g., by a RRC signaling. It may indicate that both the association order for associating the indices of the plurality of SSBs with the set of preambles and the association order for associating the indices of the plurality of SSBs with the set of PRUs will change, or indicate that one of them will change.

Figure 8:
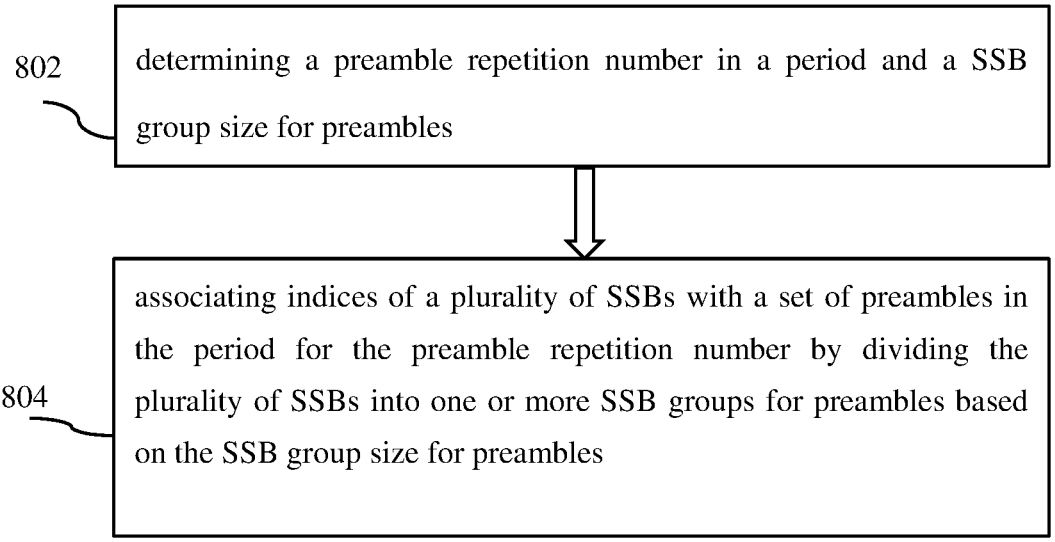
FIG. 8 illustrates an exemplary method for MsgA transmission according to some embodiments of the present application.

FIG. 8 illustrates an exemplary method for MsgA transmission according to some embodiments of the present application. As shown in FIG. 8, the method may include: determining a preamble repetition number in a period and a SSB group size for preambles in step 802, and associating indices of a plurality of SSBs with a set of preambles in the period for the preamble repetition number by dividing the plurality of SSBs into one or more SSB groups for preambles based on the SSB group size for preambles in step 804.

In some embodiments of the present application, associating the indices of the plurality of SSBs with the set of preambles can be performed in the following order:
for the plurality of SSBs:
  first, in increasing order of SSB indices within an SSB group;
  then, in increasing order of preamble repetition indices; and
  then, in increasing order of SSB group indices; and
for the set of preambles:
  first, in increasing order of time domain resource indices;
  then, in increasing order of one type indices of code domain resource indices and frequency domain resource indices; and
  then, in increasing order of the other type indices of code domain resource indices and the frequency domain resource indices.

Specifically, in some embodiments, the association order for the set of preambles can be: first, in increasing order of time domain resource indices; then, in increasing order of frequency domain resource indices; and then, in increasing order of code domain resource indices. In some other embodiments, the association order for the set of PRUs can be: first, in increasing order of time domain resource indices; then, in increasing order of code domain resource indices; and then, in increasing order of frequency domain resource indices.

The preamble repetition number can be implicitly indicated by a total number of PRACH occasion time instances for a single SSB, and the SSB group size for preambles is implicitly indicated by a total number of SSBs multiplexed in a single time instance in frequency domain and code domain. Thus, in this association order, time domain ROs for a single SSB can be more than one, e.g., as the same as the preamble repetition number when being applied in association of preamble with SSB, and as the same as the PRU repetition number when being applied in association of PRU with SSB.

Figure 9:
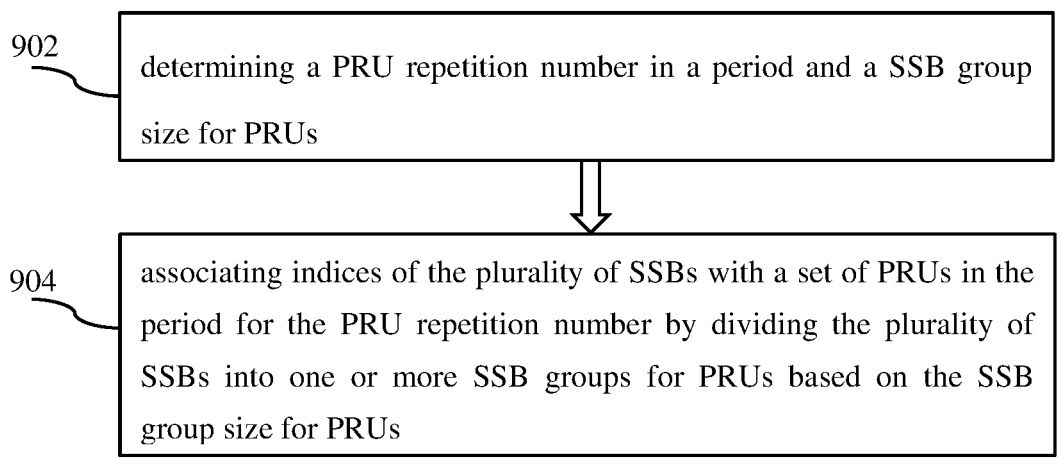
FIG. 9 illustrates another exemplary method for MsgA transmission according to some other embodiments of the present application.

Similarly, FIG. 9 illustrates another exemplary method for MsgA transmission according to some other embodiments of the present application. As shown in FIG. 9, the method may include: determining a PRU repetition number in a period and a SSB group size for PRUs in step 902, and associating indices of the plurality of SSBs with a set of PRUs in the period for the PRU repetition number by dividing the plurality of SSBs into one or more SSB groups for PRUs based on the SSB group size for PRUs in step 904.

According to some embodiments of the present application, associating the indices of the plurality of SSBs with the set of PRUs can be performed in the following order:

for the plurality of SSBs:
- first, in increasing order of SSB indices within an SSB group;
- then, in increasing order of PRU repetition indices; and
- then, in increasing order of SSB group indices; and for the set of PRUs:
- first, in increasing order of time domain resource indices;
- then, in increasing order of one type indices of frequency domain resource indices and DMRS resource indices; and
- then, in increasing order of the other type indices of frequency domain resource indices and DMRS resource indices.

Specifically, in some embodiments, the association order for the set of PRUs can be: first, in increasing order of time domain resource indices; then, in increasing order of frequency domain resource indices; and then, in increasing order of DMRS resource indices. In some other embodiments, the association order for the set of PRUs can be: first, in increasing order of time domain resource indices; then, in increasing order of DMRS resource indices; and then, in increasing order of frequency domain resource indices.

The PRU repetition number can be implicitly indicated by a total number of PRU time instances for a single SSB, and the SSB group size for PRUs is implicitly indicated by a total number of SSBs multiplexed in a single time instance in frequency domain and DMRS resource domain. In this association order, time domain ROs for a single SSB can be more than one.

As stated above, associating SSBs with preambles and associating SSBs with PRUs can be independently performed or combined together. The association orders for associating SSBs with preambles and association orders for associating SSBs with PRUs illustrated above can incorporate with each other. For example, the association order for associating SSBs with preambles illustrated in embodiments of FIG. 8 can incorporate with the association order for associating SSBs with PRUs in the embodiments of FIG. 9.

For example, according to some embodiments of the present application, a method for MsgA transmission may include: determining a preamble repetition number in a period and a SSB group size for preambles, determining a PRU repetition number in the period and a SSB group size for PRUs, associating indices of a plurality of SSBs with a set of preambles in the period for the preamble repetition number by dividing the plurality of SSBs into one or more SSB groups for preambles based on the SSB group size for preambles, and associating indices of the plurality of SSBs with a set of PRUs in the period for the PRU repetition number by dividing the plurality of SSBs into one or more SSB groups for PRUs based on the SSB group size for PRUs. Wherein, associating the indices of the plurality of SSBs with the set of preambles and associating the indices of the plurality of SSBs with the set of PRUs can be respectively performed in any adaptive order.

Figure 10:
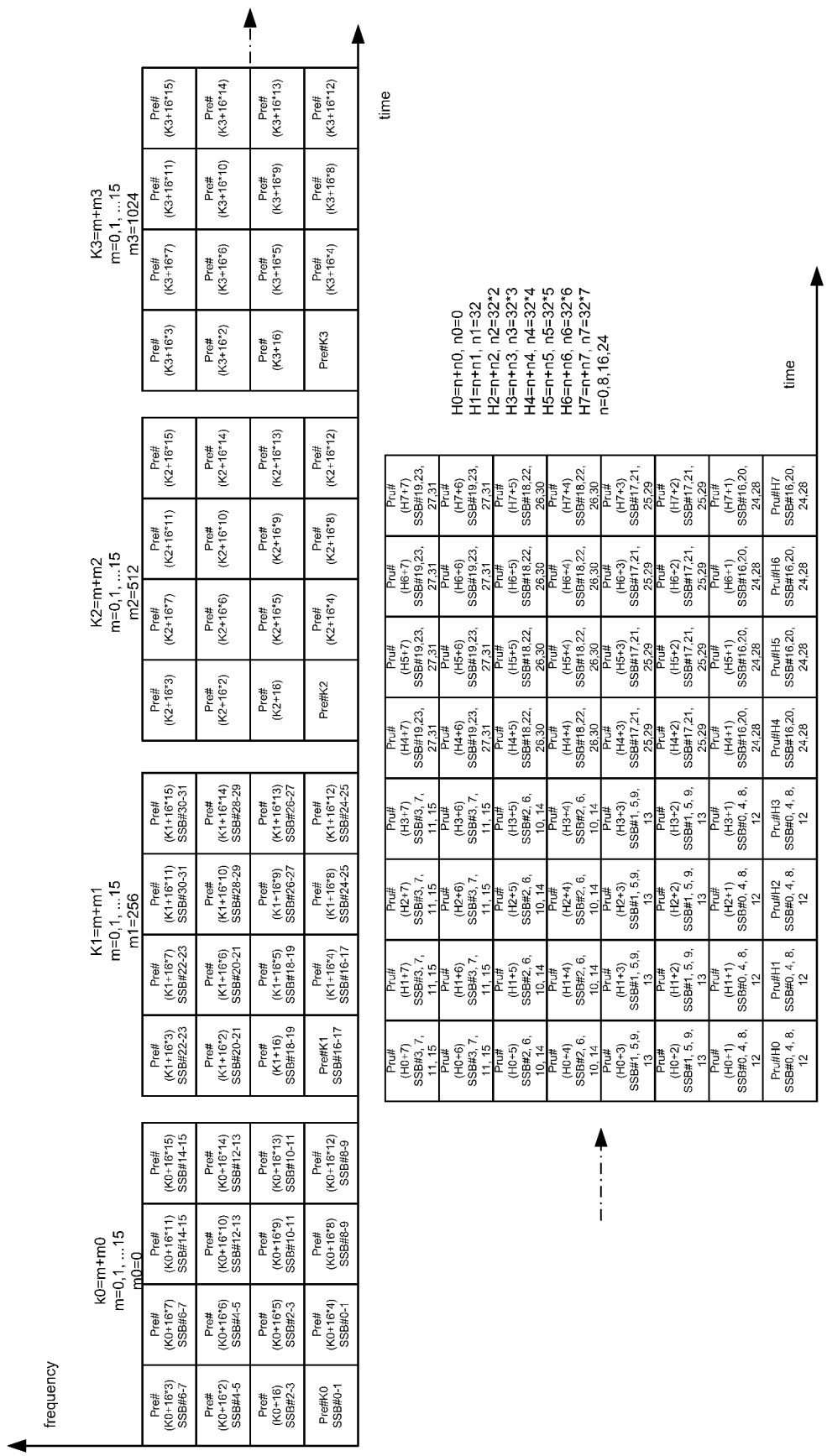
FIG. 10 illustrates an exemplary association among SSBs, preambles and PRUs achieved by a method for MsgA transmission according to some embodiments of the present application.

FIG. 10 illustrates an exemplary association among SSBs, preambles and PRUs achieved by a method for MsgA transmission according to some embodiments of the present application.

In FIG. 10, the corresponding configuration will be: SSBsPerRO is ½, which means that one SSB is associated with 2 ROs. With the order of time first mapping, 2 RO time instances will be associated with one SSB. For example, SSB #0 is associated with the $1^{st}$ and $2^{nd}$ RO time instances. So the repetition number for SSB is 2. Regarding code domain multiplexing, the number of preambles per SSB is 8, and there are 16 preambles in a RO. There can be 2 associated SSBs for one RO. So SSB #1 is also associated with the $1^{st}$ and $2^{nd}$ time instances. The preambles associated with SSB #0 will be the $1^{st}$ to the $8^{th}$ preambles in each RO, i.e., preamble #0 to preamble #7 and preamble #64 to preamble #71. The preamble associated with SSB #1 will be the $9^{th}$ to the $16^{th}$ preambles in each RO, i.e., preamble #8 to preamble #15, and preamble #72 to preamble #79. Regarding frequency domain multiplexing, the number of frequency domain resource associated with each SSB can be configured, e.g. being 1. In FIG. 10, there are totally 4 frequency domain resources, wherein each frequency domain resource is associated with 2 SSBs and there are totally 8 SSBs associated with the same time instance. Thus, the SSB group size for preambles can be determined to be 8.

For PRU, it can be configured that SSBper PRU is ¼, which means one SSB is associated with 4 PRUs. With the order of time domain first mapping, each SSB is associated with 4 PRUs, e.g. SSB #0 is associated with the $1^{st}$, $2^{nd}$, $3^{rd}$ and $4^{th}$ PRU time instances. So the repetition number for PRU is 4. Regarding frequency domain multiplexing, the number of PRU frequency domain resource associated with each SSB can be configured, e.g. being 1. In FIG. 10, there are totally 8 PRU frequency domain resources. The method to determine the mapping ratio of preamble to PRU is the same as in FIG. 6A, and the mapping ratio is 4. So one PRU is associated with 4 preambles. With 8 preambles for one SSB, there are totally 2 PRUs in frequency domain associated with one SSB. So PRU #0 and PRU #1 are associated with SSB #0, PRU #2 and PRU #3 are associated with SSB #1, PRU #4 and PRU #5 are associated with SSB #2, PRU #6 and PRU #7 are associated with SSB #3. Regarding DMRS resource multiplexing (first in DMRS port index, then in DMRS sequence index), there are 4 DMRS resources for one PUSCH. Thus, PRU #8 and PRU #9 are associated with SSB #4, PRU #16 and PRU #17 are associated with SSB #8, and PRU #24 and PRU #25 are associated with SSB #12. Then there are totally 16 associated SSBs in one PRU time instance. The SSB group size for PRU is 16.

In some embodiments of the present application, more than one time domain ROs for a single SSB can also achieve by configuring information on frequency domain resources per SSB, e.g., by the base station 510. The UE 520 will perform the association in any one of the above mapping order based on the received configuration information.

The behavior regarding more than one time domain ROs associated with a single SSB is different from the legacy technology, wherein the UE can select any one of ROs for preamble transmission. However, according to some embodiments of the present application, e.g., embodiments of FIGS. 8 and 9, more than one ROs will be used by for a single UE's preamble transmission. That is, the preamble will be transmitted multiple times if there are more than one time domain RO. This behavior regarding more than one time domain ROs associated with a single SSB can be enabled explicitly, e.g., by a RRC signaling or implicitly by the network side. In this case, the SSB group size for preamble can be configured as multiple of associated SSB number in a single time instance for preamble, and the SSB group size for PRU can be configured as multiple of associated SSB number in a single time instance for PRU.

In addition, downlink bandwidth part (BWP) transmitting SSB and uplink BWP for MsgA transmission are one-to-one mapped. Thus, in a scenario that there are multiple UEs 520 in a cell, all UEs 520 may select the same downlink BWP due to bandwidth reduction. To avoid MsgA collision, UEs will be offloaded to different uplink BWPs according to some embodiments of the present application, which can be illustrated by an exemplary method shown in FIG. 11. This mechanism is also adaptive to Msg1 transmission.

Figure 11:
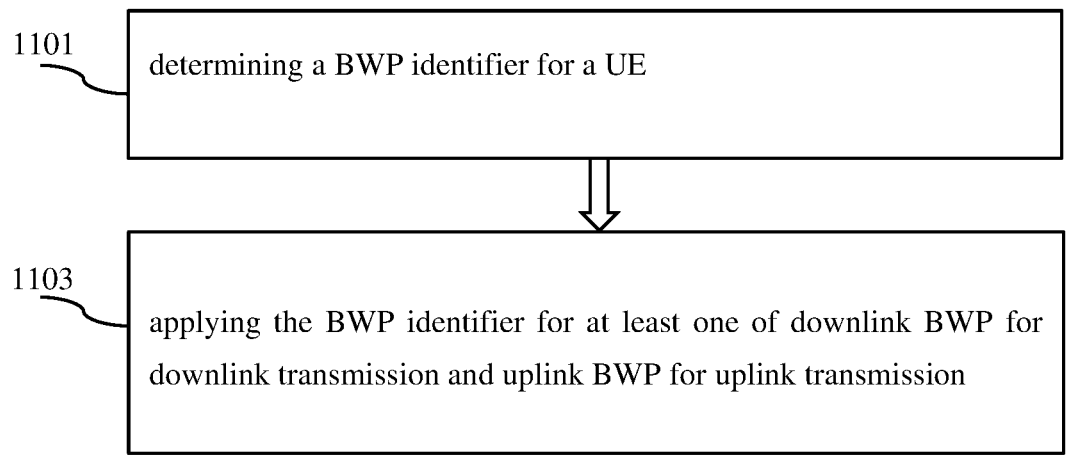
FIG. 11 illustrates an exemplary method for MsgA transmission according to some embodiments of the present application.

Specifically, FIG. 11 illustrates an exemplary method for MsgA transmission according to some embodiments of the present application. In step 1101, a downlink BWP identifier for a UE 520 can be determined, e.g., by the UE 520. The BWP identifier can be determined based on at least one of an identifier of the UE 520, a preamble repetition number of the UE 520, a PRU repetition number of the UE 520 and a category of the UE 520. In step 1103, the determined BWP identifier can be applied for at least one of downlink BWP for downlink transmission and uplink BWP for uplink transmission by the UE 520. For example, the UE 520 can determine the downlink BWP for downlink transmission based on the determined BWP identifier, or determine the uplink BWP for uplink transmission based on determined BWP identifier. The association (or mapping) of one downlink BWP with a plurality of uplink BWPs can be configured by RRC signaling. When there are more than one uplink BWP associated with a DL BWP, the selection of the uplink BWP for Msg1 or MsgA transmission can be determined based on at least one of an identifier of the UE 520, a preamble repetition number of the UE 520, a PRU repetition number of the UE 520 and a category of the UE 520. In some embodiments of the present application, the downlink BWP and the uplink BWP are one-to-one mapped, and they can use the same BWP, i.e., the BWP identified by the determined BWP identifier.

Figure 12:
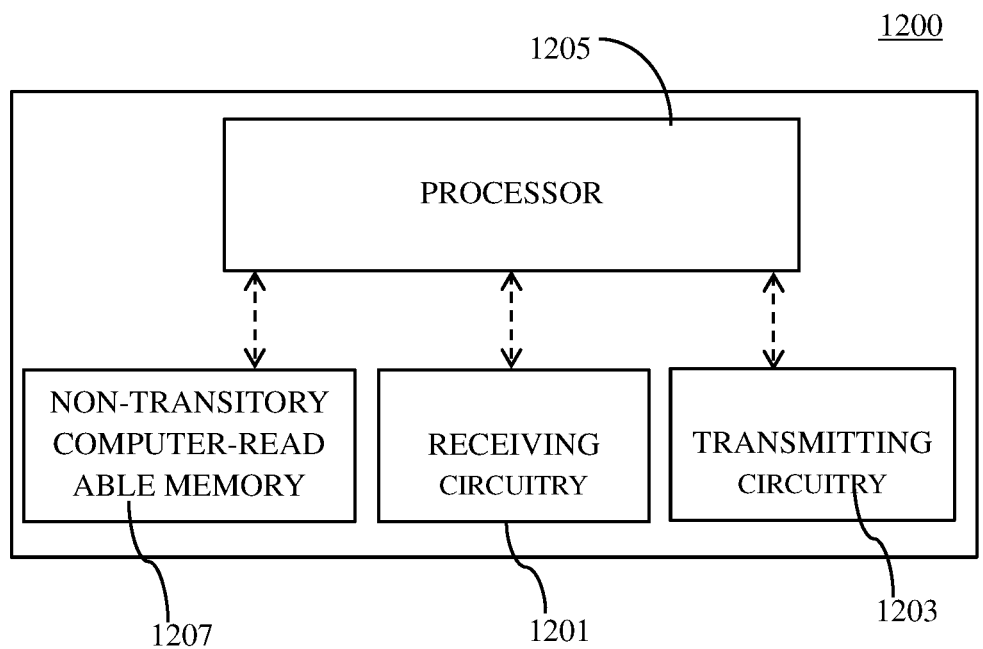
FIG. 12 illustrates a block diagram of an exemplary apparatus in accordance with some embodiments of the present application.

FIG. 12 illustrates a block diagram of an exemplary apparatus in accordance with some embodiments of the present application.

As shown in FIG. 12, the apparatus 1200 may include at least one receiving circuitry 1001, at least one transmitting circuitry 1203, at least one processor 1205, and at least one non-transitory computer-readable medium 1207. The non-transitory computer-readable medium 1207 has computer executable instructions stored therein to cause a processor to implement the method according to embodiments of the present application. The processor 1205 is configured to be coupled to the non-transitory computer readable medium 1207, the receiving circuitry 1201, and the transmitting circuitry 1203. It is contemplated that the apparatus 1200 may include more computer-readable mediums, receiving circuitry, transmitting circuitry and processors besides those shown in FIG. 12 in some other embodiments of the present application according to practical requirements. In some embodiments of the present application, the receiving circuitry 1201 and the transmitting circuitry 1203 are integrated into a single device, such as a transceiver. In certain embodiments, the apparatus 1200 may further include an input device, a memory, and/or other components.

In some embodiments of the present application, the apparatus 1200 may be a network side apparatus, e.g., a base station 510. The non-transitory computer-readable medium 1207 may have stored thereon computer-executable instructions to cause a processor to implement the operations performed in BS(s) as described above, e.g., the methods shown in FIGS. 5, 8, and 9.

In some other embodiments of the present application, the apparatus 1200 may a terminal apparatus, e.g., a UE 520. The non-transitory computer-readable medium 1207 may have stored thereon computer-executable instructions to cause a processor to implement the operations with respect to UE(s) as described above, e.g., the methods shown in FIGS. 5, 8, 9 and 11.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A user equipment (UE) for wireless communication, comprising:
   at least one memory; and
   at least one processor coupled with the at least one memory and configured to cause the UE to:
      receive signaling information indicating at least one of a total number of a set of preambles in a period, a total number of a set of physical uplink shared channel (PUSCH) resource units (PRUs) in the period, a preamble repetition number in the period, or a PRU repetition number in the period;
      determine a synchronization signal block (SSB) group size for preambles and an SSB group size for PRUs;
      associate indices of a plurality of SSBs with the set of preambles for the preamble repetition number and associate the indices of the plurality of SSBs with the set of PRUs for the PRU repetition number; and
      determine a mapping ratio of preambles to PRUs in the period based on the received signaling information.

2. A base station for wireless communication, comprising:
   at least one memory; and
   at least one processor coupled with the at least one memory and configured to cause the base station to:
      configure signaling information indicating at least one of a total number of a set of preambles in a period, a total number of a set of physical uplink shared channel (PUSCH) resource units (PRUs) in the period, a preamble repetition number in the period, or a PRU repetition number in the period;
      determine a synchronization signal block (SSB) group size for preambles and an SSB group size for PRUs;
      associate indices of a plurality of SSBs with the set of preambles for the preamble repetition number and associate the indices of the plurality of SSBs with the set of PRUs for the PRU repetition number; and
      determine a mapping ratio of preambles to PRUs in the period based on at least one of the total number of the set of preambles in the period, the total number of the set of PRUs in the period, the preamble repetition number in the period, or the PRU repetition number in the period.

3. The base station of claim 2, wherein, to associate the indices, the at least one processor is configured to cause the base station to:
   associate the indices of the plurality of SSBs with the set of preambles for the preamble repetition number by dividing the plurality of SSBs into one or more SSB groups for preambles based on the SSB group size for preambles; and
   associate the indices of the plurality of SSBs with the set of PRUs for the PRU repetition number by dividing the plurality of SSBs into the one or more SSB groups for PRUs based on the SSB group size for PRUs.

4. The base station of claim 2, wherein the mapping ratio of preambles to PRUs is a ceil of a ratio of the total number of the set of preambles to that of the set of PRUs.

5. The base station of claim 2, wherein the mapping ratio of preambles to PRUs is ceil (N-preamble*Nre-preamble/N-PRU/Nre-PRU), wherein, N-preamble is the total number of the set of preambles, Nre-preamble is a preamble repetition number, N-PRU is the total number of the set of PRUs, and Nre-PRU is the PRU repetition number.

6. The base station of claim 5, wherein if the Nre-preamble is smaller than the Nre-PRU, then a total number of preambles per synchronization signal block (SSB) is determined based on at least one of the preamble repetition number and the PRU repetition number.

7. The UE of claim 1, wherein the mapping ratio of preambles to PRUs is ceil (N-preamble*Nre-preamble/N-PRU/Nre-PRU), wherein, N-preamble is the total number of the set of preambles, Nre-preamble is a preamble repetition number, N-PRU is the total number of the set of PRUs, and Nre-PRU is the PRU repetition number.

8. The UE of claim 7, wherein, if the Nre-preamble is smaller than the Nre-PRU, then a total number of preambles per synchronization signal block (SSB) is determined based on at least one of the preamble repetition number and the PRU repetition number.

9. The UE of claim 8, wherein the total number of preambles per SSB is ceil (Nre-PRU/Nre-preamble) multiple of the total number of preambles per SSB determined if there is no repetition for preamble and PRU.

10. The UE of claim 1, wherein, to associate the indices, the at least one processor is configured to cause the UE to:
    associate the indices of the plurality of SSBs with the set of preambles for the preamble repetition number by dividing the plurality of SSBs into one or more SSB groups for the preambles based on the SSB group size for preambles; and
    associate the indices of the plurality of SSBs with the set of PRUs for the PRU repetition number by dividing the plurality of SSBs into one or more SSB groups for the PRUs based on the SSB group size for PRUS.

11. The UE of claim 10, wherein the SSB group size for preambles is at least one of determined based on explicit signaling, or implicitly determined by an amount of associated SSBs for preambles in a time instance, and wherein the SSB group size for PRUs is at least one of determined based on explicit signaling, or implicitly determined by an amount of SSBs for PRUs in a same time instance.

12. The UE of claim 10, wherein the SSB group size for preambles and the SSB group size for PRUs are a lowest common multiple of an associated SSB amount of preambles and PRUs in a time instance.

13. The UE of claim 10, wherein the at least one processor is configured to cause the UE to receive a radio resource control (RRC) signaling indicating an order of associating the indices of the plurality of SSBs with the set of preambles.

14. The UE of claim 10, wherein the at least one processor is configured to cause the UE to receive a radio resource control (RRC) signaling indicating an order of associating the indices of the plurality of SSBs with the set of PRUs.

15. The UE of claim 10, wherein the at least one processor is configured to cause the UE to associate the indices of the plurality of SSBs with the set of preambles by performing the following order:
    for the plurality of SSBs, first in increasing order of SSB indices within an SSB group, then in increasing order of preamble repetition indices, and then in increasing order of SSB group indices; and
    for the set of preambles, at least one of:
       first in increasing order of code domain resource indices, then in increasing order of frequency domain resource indices, and then in increasing order of time domain resource indices; or
       first in increasing order of time domain resource indices, then in increasing order of a first type indices of code domain resource indices and frequency domain resource indices, and then in increasing order of a second type indices of the code domain resource indices and the frequency domain resource indices.

16. The UE of claim 15, wherein the preamble repetition number is implicitly indicated by a total number of physical random access channel (PRACH) occasion time instances for a single SSB, and the SSB group size for the preambles is one of implicitly indicated by a total number of SSBs multiplexed in a single time instance in frequency domain and code domain, or configured as a multiple of a total number of associated SSBs for preambles in a single time instance.

17. The UE of claim 10, wherein the at least one processor is configured to cause the UE to associate the indices of the plurality of SSBs with the set of PRUs by performing the following order:
for the plurality of SSBs, first in increasing order of SSB indices within an SSB group, then in increasing order of PRU repetition indices, and then in increasing order of SSB group indices; and
for the set of PRUs, at least one of:
first in increasing order of frequency domain resource indices, then in increasing order of demodulation reference signal (DMRS) resource indices, and then in increasing order of time domain resource indices; or
first in increasing order of time domain resource indices, then in increasing order of one type indices of frequency domain resource indices and demodulation reference signal (DMRS) resource indices, and then in increasing order of the other type indices of the frequency domain resource indices and the DMRS resource indices.

18. The UE of claim 17, wherein the PRU repetition number is implicitly indicated by a total number of PRU time instances for a single SSB, and the SSB group size for the PRUs is one of implicitly indicated by a total number of SSBs multiplexed in a single time instance in frequency domain and DMRS resource domain, or configured as a multiple of a total number of associated SSBs for PRUs in a single time instance.

19. A processor for wireless communication, comprising:
at least one controller coupled with at least one memory and configured to cause the processor to:
receive signaling information indicating at least one of a total number of a set of preambles in a period, a total number of a set of physical uplink shared channel (PUSCH) resource units (PRUs) in the period, a preamble repetition number in the period, or a PRU repetition number in the period;
determine a synchronization signal block (SSB) group size for preambles and an SSB group size for PRUs;
associate indices of a plurality of SSBs with the set of preambles for the preamble repetition number and associate the indices of the plurality of SSBs with the set of PRUs for the PRU repetition number; and
determine a mapping ratio of preambles to PRUs in the period based on the received signaling information.

20. A method performed by a user equipment (UE), the method comprising:
receiving signaling information indicating at least one of a total number of a set of preambles in a period, a total number of a set of physical uplink shared channel (PUSCH) resource units (PRUs) in the period, a preamble repetition number in the period, or a PRU repetition number in the period;
determining a synchronization signal block (SSB) group size for preambles and an SSB group size for PRUs;
associating indices of a plurality of SSBs with the set of preambles for the preamble repetition number and associating the indices of the plurality of SSBs with the set of PRUs for the PRU repetition number; and
determining a mapping ratio of preambles to PRUs in the period based on the received signaling information.

* * * * *